United States Patent [19]
Stella et al.

[11] 3,895,862
[45] July 22, 1975

[54] PROCESSING FLUID RELEASE DEVICE AND METHOD FOR MULTIPURPOSE FILM CASSETTES

[75] Inventors: Joseph A. Stella, Peabody; Edward F. Burke, Jr., Reading; Paul B. Mason, Magnolia, all of Mass.

[73] Assignee: Polaroid Corporation, Cambridge, Mass.

[22] Filed: Dec. 26, 1973

[21] Appl. No.: 428,377

[52] U.S. Cl. .................................. 352/130; 352/72
[51] Int. Cl. ............................................ G03c 11/00
[58] Field of Search ...... 352/130, 72; 354/313, 314, 354/317, 331

[56] References Cited
UNITED STATES PATENTS 3,667,361 6/1972 Meggs ..................................... 95/13
3,806,245 4/1974 Land .................................. 352/130

Primary Examiner—Monroe H. Hayes
Attorney, Agent, or Firm—David R. Thornton

[57] ABSTRACT

A pull-strip arrangement for removing a tear-tab closure initially sealing a supply of processing fluid in a multipurpose film cassette of the type containing a photographic film strip for exposure, processing and viewing without removal from the cassette. The pull-strip is formed with a free end portion adapted to urge and connect with the supply end of the film strip automatically on reversal or rewind movement after exposure. Also the tear-tab closure is separated from the pull-strip and stored in a chamber after removal from the processing liquid supply.

30 Claims, 7 Drawing Figures

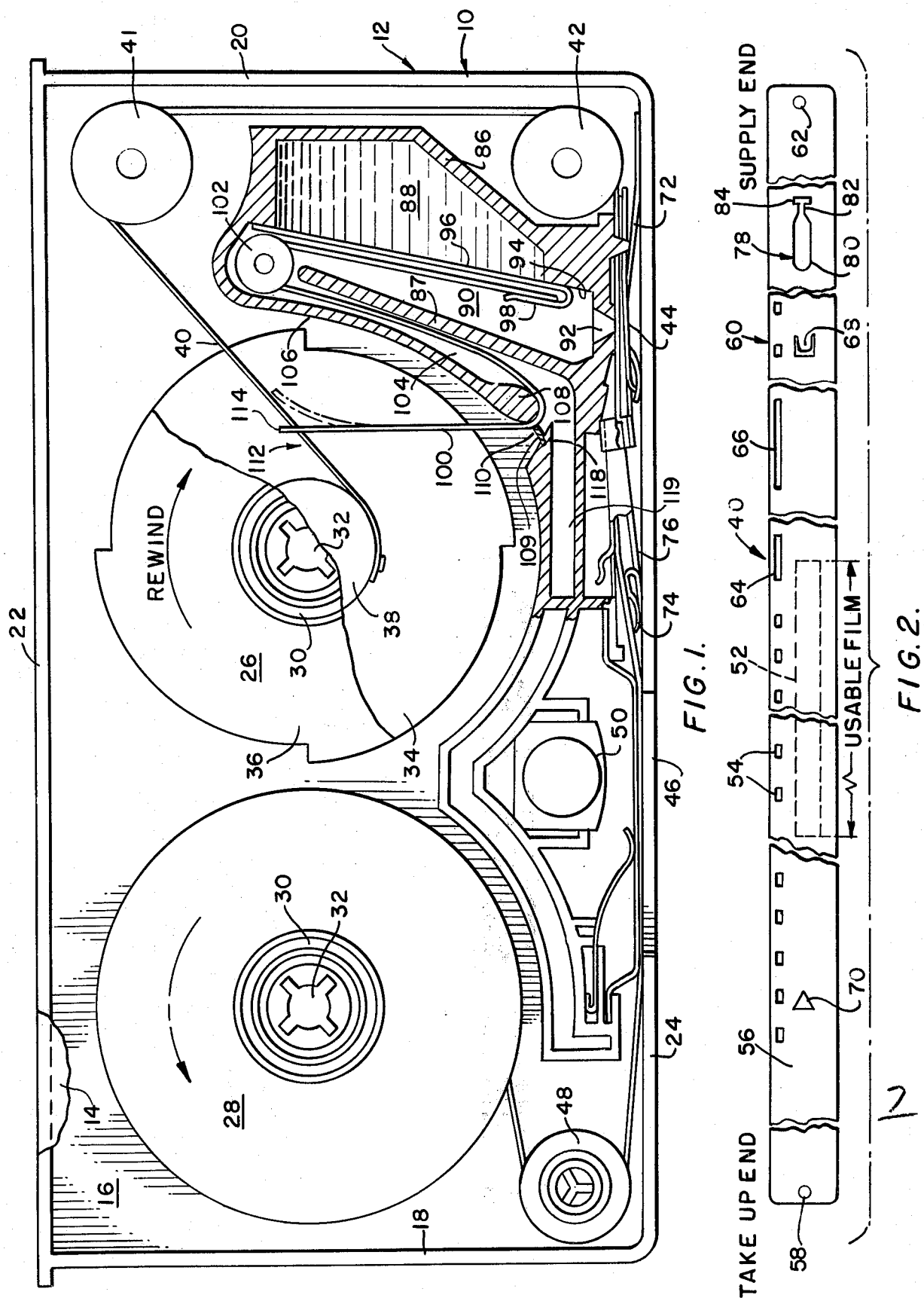

PROCESSING FLUID RELEASE DEVICE AND METHOD FOR MULTIPURPOSE FILM CASSETTES

BACKGROUND OF THE INVENTION

This invention relates to multipurpose photographic film cassettes and more particularly, it concerns an improved apparatus and method for releasing processing fluid from an initially sealed reservoir forming part of a film processing organization of such cassettes.

Multipurpose photographic film cassettes have been developed for use in motion picture photographic systems illustrated and described, for example, in U.S. Pat. No. 3,615,127 issued to Edwin H. Land on Oct. 26, 1971; U.S. Pat. No. 3,623,417 issued Nov. 30, 1971 to Vito K. Eloranta and in a copending application of John F. Batter, Jr. et al, Ser. No. 227,092, filed Feb. 17, 1972, now U.S. Pat. No. 3,785,725 issued Jan. 15, 1974, all of which are owned by the assignee of the present invention. In such systems, a strip of photographic film contained in a cassette can be exposed in a camera adapted to receive the cassette and then processed to provide viewable images by placing the cassette in a viewing apparatus equipped to activate a cassette contained processor upon rewinding the exposed film strip. After processing in this manner, the viewing apparatus is operated as a projector to advance the film incrementally frame by frame past the light source so that the scene to which the film was exposed is reproduced in a manner well-known in the motion picture art.

In systems of the type aforementioned, the processing operation after film exposure and before viewing entails the deposition of a uniform coating of processing fluid along the length of the film strip to effect a diffusion transfer of a negative image in a light sensitive emulsion layer on the film strip to a positive image receiving layer or interface. The processing fluid supply is contained in an initially closed reservoir or pod housed within the film casette, the reservoir having a removable tear-tab closure capable of being opened upon activation of the processor by the viewing apparatus to allow the fluid to escape from the pod and pass through a nozzle-like opening against the exposed emulsion layer on the film strip. Although the processor is operated only once in any single cassette which provides a permanent housing for the film strip therein, its operation to achieve a uniform and complete layer of processing fluid over the exposed emulsion layer on the film strip is vital to satisfactory operation of the overall system since any defect in the operation of the processor will result in undesirable and permanent blemishes plainly observable during projection of the processed film.

To ensure retention of the processing fluid in the cassette contained reservoir or pod up to the time it is needed for the processing operation, and also in some measure to ensure complete availability of the processing fluid upon initial activation of the processor, the processing fluid reservoir in such systems is provided with a relatively large opening covered initially by a releaseably bonded tear-tab closure capable of being completely peeled from the opening to release the processing fluid for distribution against the emulsion layer of the exposed film strip. In prior systems of the type mentioned above, the tear-tab initially sealing the processing fluid reservoir extends from one end of the reservoir opening to the other at which it is folded back on itself, trained over a guide roller and connected to one end of a lever arm operable to pull the folded back portion of the tear-tab causing it to peel back on itself away from the reservoir opening and allow the fluid to pass therefrom for the processing operation. The lever arm is part of an actuator assembly and is arranged in the cassette for a measure of movement with respect to the periphery of the supply spool in the cassette provided with ratchet-like configurations in its periphery. The lever arm is initially held in a position to allow free movement of the supply spool allowing the film strip to pay out during exposure. The viewing device in which the cassette is placed after exposure has a provision for releasing the arm to a position in which the end opposite from the tear-tab extension will be picked up by the supply spool and moved through a sufficient angle to complete the tear-tab removal operation during initial rewind movement of the supply spool.

The lever arm actuator assembly of this type is highly reliable and effective in operation but constitutes, in itself, a significant number of component parts to be incorporated both in the viewing apparatus and in each cassette. Because the processing operation is performed only once in each cassette, the incorporation of multiple parts in the actuator assembly is of little or no consequence to effective operation and minimal maintainence requirements of the system. On the other hand, the multiple actuator components do represent an unwanted increment of manufacturing costs in terms of individual component fabrication and in their assembly within the cassette. In addition, the interconection of the viewing apparatus with the cassette required to release the actuator assembly necessitates an aperture for this purpose in the cassette housing, thereby giving rise to a potential light leakage. While such a light leakage is immaterial once the film has been processed, the cassette also serves as a light tight housing for the unexposed film subsequent to manufacture and assembly and prior to exposure.

SUMMARY OF THE PRESENT INVENTION

In accordance with the present invention, an improved multipurpose film cassette is provided particularly for use in motion picture photographic systems of the type aforementioned and which requires no viewer mounted or other external means for effecting a release of processing fluid from an initially sealed storage reservoir to initiate a processing cycle automatically upon rewinding the film strip after exposure in the cassette. The release of processing fluid from the reservoir is brought about by a pull-strip extension connected at one end to a folded back portion of the reservoir sealing tear-tab and having at its free end, a configuration adapted to engage in an aperture formed in the leader end of the film strip attached to the supply spool during initial rewind rotation of the supply spool. The pull-strip, which may be mylar or other similar material having the physical characteristics of a photographic film strip, is initially supported and constrained to an essentially Z-shaped path in which the intermediate leg is established by a channel formed by internal cassette walls. At its exit from the channel, the extension is bent back on itself without exceeding the elastic limits of the material from which it is made so that the projecting free end lies yieldably against the outer convolutions of the film strip on the supply spool. As the film strip pays out from the supply spool during exposure, the free end of the pull-strip will move inwardly due to the diminishing diameter of film strip convolutions on the supply spool until the film strip is completely exposed. At this time, an aperture in the supply spool connected leader end of the film strip will have passed the free end of the pull-strip extension so that upon rewinding of the film strip back onto the supply spool the free end of the pull-strip will engage in the film strip aperture and become entrained between successive convolutions of the film strip supply spool leader. Continued rewind rotation of the supply spool will effect a pulling action on the pull-strip and correspondingly, a peeling of the tear-tab closure from the processing fluid reservoir to release the processing fluid for application thereof to the exposed film strip.

The pull-strip may be provided with suitable means such as a latching tongue by which it will become secured to the supply spool leader end of the film strip. The tear-tab closure, however, after having been peeled completely from the processing fluid reservoir is disengaged from the pull-strip by a knife-like formation at the exit of the channel formed by the internal cassette walls. Hence the channel becomes a storage chamber for the removed tear-tab closure and in which it will remain once the processing cycle has been completed. In this manner, there will be no contamination of the film strip as a result of contact thereof by any portion of the tear-tab closure which had been in contact with the processing fluid initially sealed in the reservoir.

Among other objects of the present invention are: an improved method of depositing a processing fluid layer on an exposed emulsion surface of a cassette contained photographic film strip; the provision of an improved multipurpose film cassette capable of containing a strip of photographic film during exposure, processing and projection; the provision of such an improved cassette which does not require external means to initiate a processing cycle upon rewinding the strip following exposure; the provision of such an improved film cassette for achieving uniform application of processing fluid to an exposed emulsion layer on the cassette contained film strip; the provision of such an improved film cassette in which the number of components necessary to initiate a processing cycle is reduced to a minimum; and the provision of an unique and improved pull-strip organization for initiating the exposed film processing operation in motion picture systems of the type referred to.

Other objects and further scope of applicability of the present invention will become apparent from the detailed description to follow below taken in conjunction with the accompanying drawings in which like reference numerals designate like parts.

BRIEF DESCRIPTION OF THE DRAWINGS

FIG. 1 is a side elevation of the film cassette of this invention with the front wall thereof cut away and other portions thereof in partial section to illustrate the internal working components;

FIG. 2 is a fragmented plan view of the film strip to be used in the cassette shown in FIG. 1;

DETAILED DESCRIPTION OF THE PREFERRED EMBODIMENT

Figure 3:
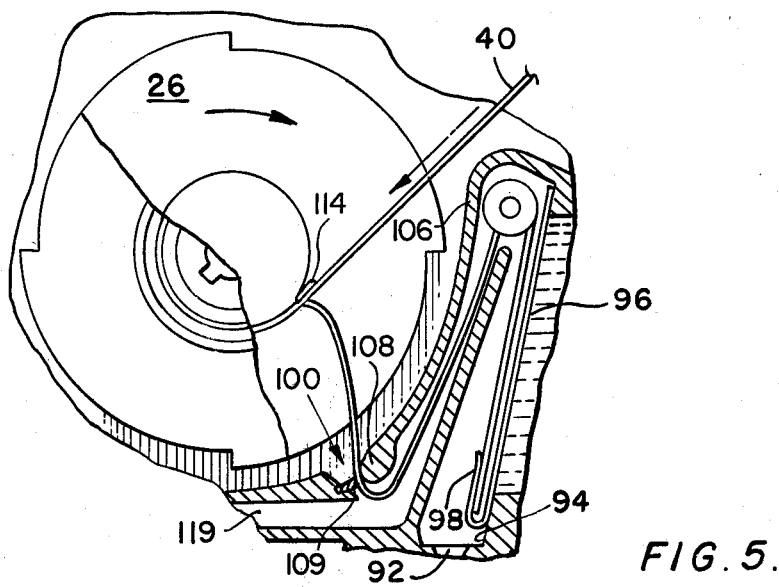
FIGS. 3, 4 and 5 are cut-away fragmentary side elevations illustrating the cassette supply spool as well as the processing fluid reservoir tear-tab closure and pull-strip extension thereof in different phases of the processing cycle.

In the drawings, the improved multipurpose cassette of the present invention is generally designated by the reference numeral 10. As shown in FIG. 1, the cassette includes a generally parallelepiped casing or housing 12 established by planar faces or side walls 14 and 16, end walls 18 and 20 and elongated top and bottom edge walls 22 and 24, respectively. A pair of spools respectively designated hereinafter as a supply spool 26 and a take-up spool 28 are supported rotatably in the housing by annular, light-tight bearings 30 on the spools engaged by complementing ring-like embossments (not shown) on the interior of the side walls 14 and 16. Also each spool is provided with a drive socket 32 for engagement by appropriate drive shafts in either of the camera (not shown) or the viewing apparatus (not shown) with which the cassette is used in accordance with the overall system described in the prior references above cited. Each of the spools 26 and 28 is provided further with a pair of opposed flanges 34 and 36 affixed to opposite ends of central hubs 38 to which opposite ends of a film strip 40 are permanently connected. Although the film strip will be described in more detail below, it will be noted from FIG. 1 that the path of the film strip 40 in the housing 12 extends from the hub 38 of the supply spool 26 about guide rollers 41 and 42 across a normally inoperative film processing station 44, an opening 46 in the bottom edge wall 24, about a further guide roll 48 and to the take-up spool 28. The opening 46 functions at different times to facilitate both exposure and projection of the film strip 40, a prism 50 being located behind the film strip at the opening 46 to facilitate the latter operation.

Because the film strip 40 functions as an operating component in the cassette over and above its principal function of recording photographic images, reference is now made to FIG. 2 of the drawings in which the full length of the strip is illustrated. As shown, the film is provided with a major central portion 52 of usuable film upon which projectable images may be formed. To this end, the film strip includes a carrier base of any suitably strong transparent material carrying an emulsion or photo-sensitive coating of any conventional variety; for example, an emulsion developed by a monobath processing composition to form a positive transparency suitable for projection. Also a series of uniformly spaced sprocket holes 54 are provided along the length of the film to facilitate incremental film advance during exposure and projection. At least the carrier base of the strip extends beyond the end of the central portion of usuable film 52 to provide at one end a take-up leader 56 having an aperture 58 by which the take-up leader may be permanently affixed to the hub of the take-up spool 28. A supply leader 60 at the opposite end of the strip is similarily provided with an aperture 62 for permanent connnection to the hub 38 of the supply spool 26. As described in the aforementioned copending patent application Ser. No. 227,092, the strip is additionally provided with a pair of elongated sprocket holes 64 and 66 each of the approximate proportionate lengths illustrated in FIG. 2, for the purpose of interrupting advance travel of the strip by the incremental drive mechanisms provided in the camera (not shown) and the projecting apparatus (not shown) with which the cassette is used. Specifically, the sprocket hole 64 terminates incremental advance of the film in the camera whereas the longer sprocket hole 66 terminates incremetal advance of the film strip in the projector. Also as described in the copending application Ser. No. 227,092, the film strip is provided in its supply leader 60 with a depressed tongue-like formation 68 projecting out of the plane of the film and at its take-up end with a triangular aperture 70. The tongue-like depression 68 functions upon initiation of the processing cycle to advance a slidable pressure pad 72 (FIG. 1) into operative position whereas the triangular aperture 70 functions at the end of the processing cycle to engage a tongue 74 at one end of a valve member 76 and move the valve member to seal the processor 44 at the end of the processing cycle. Inasmuch as these operations are fully described in the aforementioned copending application, no further discussion is needed here. It is noted, however, that the configuration of the film strip 40 illustrated in FIG. 2 is essential to overall operation of the system in which the cassette is used and, therefore, accounted for by features of this improvement invention.

Also as shown in FIG. 2 and constituting a feature novel with the present invention, the supply leader 60 is provided with a discontinuity, preferably an aperture 78 of bottle-shaped configuration to provide a major aperture portion 80 extending in the direction of the central film strip section 52 connected by a necked-down portion 82 with an undercut or transverse slot-like portion 84. The function and operation of the aperture 78 will be described in more detail below.

With reference again to FIG. 1 of the drawings, it will be noted that the processing station 44 is formed in part by internal cassette transverse wall formations 86 and 87 defining in part a pair of chambers 88 and 90, the latter of which opens at its bottom to a processing fluid applicator nozzle 92 positioned to overlie the emulsion carrying surface of the film strip 40 as it passes between the cassette exposure-projection opening 46 and the guide roller 42. The chamber 88 constitutes an initially sealed reservoir for processing liquid and opens along one upright side to the chamber 90 at a planar face 94 to which a releaseable tear-tab closure 96 is initially affixed by bonding, fusion or the like. It should be noted that although the wall formation defining the respective chambers 88 and 90 as well as the nozzle 92 are depicted as one piece in FIG. 1 of the drawings, in practice the processing liquid handling functions served by the illustrated structure may be served equally well by more easily assembled separate components. For example, as shown in FIG. 1 the chamber 88 provides in itself an initially sealed processing liquid reservoir whereas in practice, the chamber may provide an internal receptacle for a prefabricated and self-contained pod of processing liquid to which the tear-tab closure 96 is affixed in essentially the same manner as that shown in FIG. 1. In this way cassette assembly can be facilitated without compromise in the achievement of a completely sealed reservoir for the processing fluid.

The tear-tab 96, as shown in FIGS. 1 and 3 of the drawings, extends from the top of the chamber 88 downwardly over the planar face 94 to the bottom of the chamber and near the nozzle 92 and is reversely folded or bent at its bottom to establish an upwardly directed leading end portion 98 secured by bonding, fusion or other suitable means to one end of a pull-strip extension 100. For reasons which will become more apparent in the description to follow, the securement of the tear-tab to the pull-strip extension is in lap joint fashion so that the pull-strip 100 initially lies within the reverse bend of the tear-tab, which is important to the achievement of separation of the pull-strip from the tear-tab closure after these components have served their processing function.

The pull-strip 100 extends upwardly from the lap joint with the tear-tab closure portion 98, about a guide roller 102 and downwardly through a channel 104 defined in part by the wall formation 87 and in part by another transverse wall formation 106. The wall formation 106 is interrupted at a radius portion 108 establishing one side of an exit opening 110 from the channel 104 and through which the pull-strip 100 passes after a second reverse bend thereby to establish an initially essentially Z-shaped configuration in the pull-strip. A sealing member 109 of resilient material extends across the exit opening to seal the latter following processing. The pull-strip 100 is formed by any suitable resilient material such as mylar or other material having physical characteristics comparable to the strip of photographic film, and is initially supported in passing about the roller 102 and the radius portion 108 to the film so as to stress the pull-strip within its elastic limit so as to provide an inherent bias tending to restore the pull-strip to an initially straight condition. Thus, the free end portion 112 of the pull-strip 100 projecting from the exit 110 will be urged yieldably against the outermost convolution of film strip wound on the supply spool 26. Furthermore, as the diameter of the outer convolution diminishes during transfer of the film strip 40 from the supply spool to the take-up spool 28 during exposure, the projecting free end 112 of the pull-strip will remain in contact with the film strip with the free end 112 deflected in the direction of film strip travel during exposure as depicted by phantom lines in FIG. 1. In this connection, it will be noted that the length of the free end portion of the pull-strip projecting from the exit 110 is greater than the radial dimension of the annulus represented by convolutions of the film strip when fully wound on the supply spool 26. Because of this, the free end portion 112 will lie yieldably against the film strip 40 irrespective of the spacing thereof from the wall formation 106 and the exit 110 within the range of spacing between the periphery of the hub 38 and the flanges 34, 36 of the supply spool.

Figure 7:
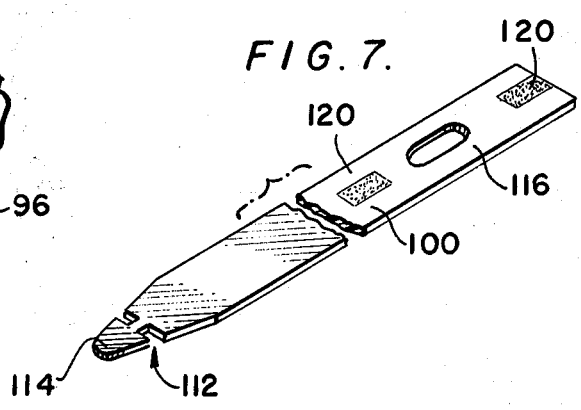
FIG. 7 is a perspective view illustrating the free end of the pull-strip extension.

As shown in FIG. 7 of the drawings, the free end portion 112 of the pull-strip extension 100 is tapered and necked down to provide a latching tongue 114. The size and shape of the latching tongue 114 is such that it will engage in the bottle-shaped aperture 78 in the supply end leader 60 of the film strip 40 upon initial rewind movement of the film strip 40 back onto the supply spool 26. In this context, it is noted that the position of the bottle-shaped opening 78 on the film strip leader is such that it will be at or passed the free end of the pull-strip 100 when the film strip has traveled fully from the supply spool 26 to the take-up spool 28 after exposure. Also the pull-strip 100 is provided with an elongated aperture 116 spaced from the free end 112 thereof by a distance approximately the same as the distance between the bottle-shaped opening 78 and the depressed tongue 68 in the supply end leader of the film strip 40.

Figure 6:
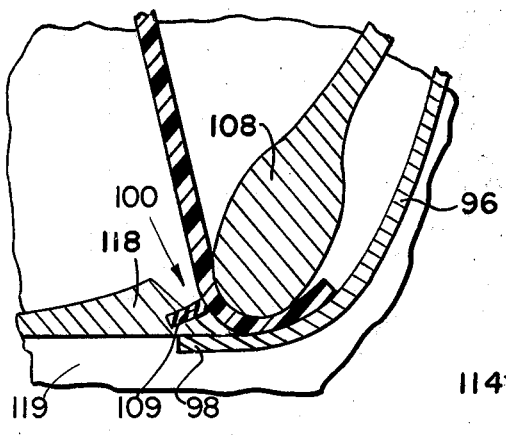
FIG. 6 is an enlarged sectional view illustrating the separation of the tear-tab closure from the pull-strip extension.

As shown in FIGS. 1 and 6 of the drawings, the wall formation 106 extends past the exit 110 to provide a channel extension 119, and has in its edge opposite the exit from the radius formation 108 a knife-like formation 118. As depicted most clearly in FIG. 6, the relative orientation of the radius portion 108 and the knife-like portion 118, coupled with the nature of the lap joint connection of the tear-tab closure 96 to the pull-strip 100, will effect a separation of the tear-tab from the pull-strip as the latter passes completely through the exit 110. In this regard, the leading end 98 of the tear-tab 96 is unsealed to the pull-strip for a short distance, for example 1/16 inch, such that the leading end tends to open or move away from the pull-strip 100 as the latter turns around the turning point 108 and passes to the interior edge of the knife blade 118 so as to facilitate separation.

Also as shown in FIG. 7, the pull-strip 100 may have provided on a surface thereof ultimately put into direct contact with the film strip leader 60, one or more areas of pressure sensitive adhesive 120 for reasons which will become more apparent from the description of the operation of the cassette following below.

Operation of the improved cassette of the present invention to effect exposure of the film strip 40 in a suitable camera is essentially the same as that disclosed in the aforementioned copending application Ser. No. 227,092. Following exposure in the camera, the cassette 10 is placed in a projecting apparatus to be vertically oriented in the position illustrated in FIG. 1 of the drawings. Also as disclosed in the aforementioned copending application, the film strip 40 is initially advanced in the projecting apparatus to the elongated slot 66 so that the depressed tongue formation 68 in the supply end leader advances the pressure pad 72 to retain the film strip firmly against the bottom of the nozzle opening 92. At this point in the operation, the pull-strip end 114 will preferably be extended through the film opening 78. Unlike the prior apparatus which requires an enabling function to be effected by the projection apparatus on a mechanical tear-tab actuator assembly, however, the projector thereafter is merely operated to rewind the film strip from the take-up spool 28 back to the supply spool 26.

Hence, it should be noted that the film aperture 78 is spaced from the film bump 68 and the elongated film slot 66 a distance equal to or less than the film path length, respectively, between the tip 114 of the pull-strip 112 and the pad 72 and the opening 46 so that when the projector claw enters the slot 66 (ceasing further forward motion of the film) and the bump 68 is in engagement with the pad, the film aperture 78 will be aligned with the tip of the pull-tab (or slightly advanced forwardly thereof) and thereby provide proper engagement of the pull-strip upon initiation of the rewind motion.

As shown in FIGS. 1 and 3–5 of the drawings, upon such rewinding of the film strip 40 the latching tongue 114 at the free end 112 of the pull-strip 100, if not already in engagement, will because of its inherent resilience ride into the large portion 80 of the aperture 78 in the supply end leader 60 and be secured initially in the transverse slot section of the aperture 80. As the film strip is further rewound, the tongue 114 becomes positively anchored by the aperture 78 and folded back on itself and the intervening film strip between successive convolutions on the supply spool. The establishment of this interlatched condition of the pull-strip 100 with the film strip is depicted in FIGS. 1 and 3 of the drawings.

Figures 4, 5:
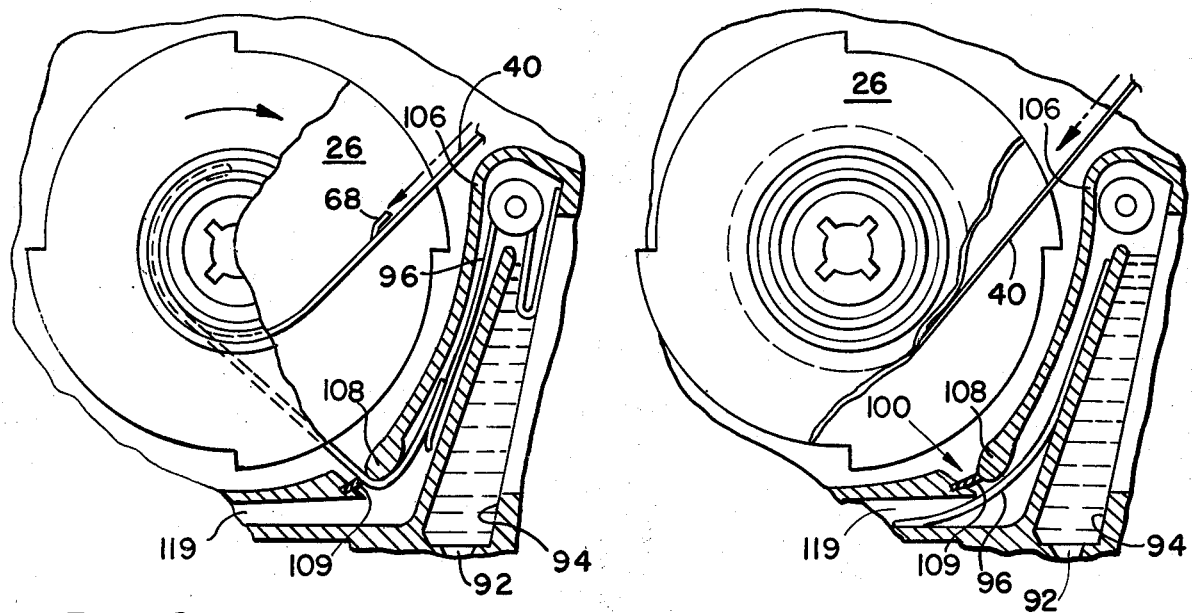

With the free end of the pull-strip extension 100 firmly secured between successive convolutions of the film strip 40 specifically the supply end leader 60 thereof, further rewinding rotation of the supply spool 26 will operate to pull the pull-strip 100 about the guide roller 102 to effect opening of the reservoir 88, or, that is, a peeling removal of the tear-tab closure 96 from the opening face 94 of the reservoir 88 as depicted in FIG. 4. This permits release of the fluid to the chamber 90 and through the nozzle 92 to the film strip under the influence of gravity. Also, as shown in FIG. 4, the aperture 116 in the pull-strip will overlie the tongue depression 68 in the supply end leader 60 to enable a relatively smooth wrapping of the pull-strip 100 into the supply spool convolutions of film strip. Further, in regard to smooth wrapping of the film, the length (from the folded tip) of the pull-strip 100 is made approximately equal or slightly less than the circumference of the spool hub so that the ends of the tab are substantially in alignment without overlap thereof.

When the end portion 98 of the tear-tab closure is drawn to the channel exit 110, the knife-like formation 118 will separate the tear-tab 96 from the pull-strip 100 in the manner shown most clearly in FIG. 6 of the drawings. Advantageously, this stores the tear-tab 96 separately from the pull-strip 100 and within the processor housing 86. The separate storage is desirable since the tear-tab is wider than the film strip 40 to permit the maximum width of the fluid reservoir 88 and a wide mouth (not shown) of the same. Additionally, it is advantageous to preclude contact between the wet tear-tab 96 and other critical portions of the cassette, particularly the film strip 40. This is accomplished by retaining the tab 96 within the eventually sealed processor.

In the illustrated embodiment, the distance between the knife edge member or separator 118 and the upper region or top of the storage reservoir 88 approximates the overall length of the tear-tab 96 so that when the leading end portion 98 of the tear-tab reaches the trailing edge of the reservoir in its travel, the tear-tab will be completely removed from the planar surface 94. The channel 104, therefore, and its extension past the exit 110 will function thereafter as a storage chamber for the tear-tab closure 96 so that it will not in any way interfere with subsequent use of the cassette for projection operations. In this regard, the extension 119 of the channel 104 equals or exceeds the length of the overlap between the tear-tab 96 and the pull-strip 100 to thereby provide complete separation of both before further travel of the tab is stopped by the bottom of the extension.

Hence, it should be understood that the Z-shaped formation of the pull-strip 100 in its initial position compactly provides a pull-strip path of sufficient path length to insure complete removal of the tear-tab from the reservoir, and complete opening of the latter, before strip and tab separation.

Continuing with the operation, following separation of the pull-strip 100 from the tab 96, the pull-strip is wound onto the film spool 26 with the film strip 40, and the latter is coated with processing fluid flowing through the exit orifice 92 at the base of the chamber 90. At the completion of the rewind operation, when the take-up end 56 of the film strip 40 is reached, the film aperture 70 engages the valve member 76 and displaces the latter (to the left in the cassette as shown in FIG. 1) to close off the nozzle opening 92 and seal the processor. Following this, the film is then advanced forwardly in stepwise fashion while illumination is directed through the prism 50 for projection or viewing of the recorded images.

During this latter operation and subsequent projection operations, the pull-strip 100 remains attached to the film strip 40 by means of its folded latch condition. However, although the pressure sensitive adhesive areas 120 are not essential to satisfactory operation of the cassette, such a provision by which the pull-strip 100 will become permanently affixed to the supply end 60 leader of the film strip is desirable to prevent interference with subsequent cassette operation.

Thus it will be seen that by this invention there is provided an improved multipurpose photographic film cassette by which the above mentioned objectives are completely fulfilled. It will be appreciated also that various modifications and/or changes can be made in the embodiment illustrated and described herein without meaningful departure from the present invention. It is expressly intended, therefore, that the foregoing description is illustrative of preferred embodiments only, not limiting, and that the true spirit and scope of the invention be determined by reference to the appended claims.

What is claimed is:

1. In a film cassette containing a strip of photographic film to be exposed and processed without removal from the cassette, processing means also contained in the cassette and having a processing fluid reservoir initially sealed by a tear-tab to be removed by advancement of the tear-tab upon completion of film exposure so as to release reservoir contained processing fluid for deposit on the film strip, the improvement comprising:
   a pull-strip joined at one end to said tear-tab; and
   means for guiding said pull strip along a predetermined path to advance said tear-tab and release the processing fluid from said reservoir and for separating said pull strip from said tear-tab following release of the processing fluid.

2. The cassette of claim 1 wherein said tear-tab is advanced a predetermined distance to open the reservoir and effect release of the fluid, and said separating means includes a member located adjacent said predetermined path, said member spaced from said tear-tab along said path a distance at least substantially equal to said predetermined distance so as to effect opening of the reservoir prior to separation of said pull-strip and said tear-tab.

3. The cassette of claim 1 wherein said separating means includes a separator member located ajacent said predetermined path, and said guide means includes means for guiding said pull-strip along a tortuous path intermediate said reservoir and said separator member.

4. The cassette of claim 1 additionally including means for storing said tear-tab following removal thereof from said reservoir, and wherein said separating means includes means for directing the leading end of said tear-tab to said storing means.

5. The cassette of claim 1 wherein said guiding means includes a turning point configured to support the inner surface of said pull-strip and said separating means includes a diverter member located adjacent the other side of said pull-strip at said point and configured to engage the leading end of said tear-tab thereat and divert it from said predetermined path as said pull-strip is advanced along said predetermined path, and a portion of said pull-strip is spaced from said leading end of said tear-tab and is disposed in overlapping engagement with said other side of said pull-strip such that said leading end of said tear-tab tends to open away from said pull-strip as said pull-strip traverses said turning point.

6. The apparatus of claim 1 including a processor station having a housing having exit means and defining said reservoir and at least portions of said guiding means, said housing including an interior channel extending from said reservoir to said exit means, said pull-strip being initially extended through said exit means, and said housing further defines said separating means including a separator member located at least close to said exit means and configured to separate said pull-strip from said tear-tab and threby retain said tear-tab within said housing as said pull-strip is drawn from said housing.

7. The cassette of claim 6 wherein said channel extends beyond said exit means to provide means for storing at least a leading end of said tear-tab.

8. The cassette of claim 7 including means for sealing said exit means following withdrawal of said pull-strip from said housing.

9. The cassette of claim 1 additionally including means for advancing such film strip, and means for automatically advancing said pull-strip along said given path responsive to such film advancement.

10. The cassette of claim 9 wherein said pull-strip advancing means includes means for coupling said pull-strip to such film strip so as to advance said pull-strip therewith.

11. The cassette of claim 10 where said coupling means includes:
   means defining a necked down aperture in said film strip; and
   a tapered necked down latching tongue formation in said pull-strip configured to interlock with said necked down aperture in said film strip.

12. The apparatus recited in claim 11 wherein said film strip aperture is of bottle-shaped configuration to provide an enlarged aperture portion through which said latching tongue may extend and a neck portion trailing said enlarged aperture portion in the direction of film strip travel during engagement.

13. An applicator for depositing processing fluid on a moving run of a strip of photographic film material, said applicator having a housing, means within said housing for defining a processing fluid reservoir initially sealed by a tear-tab configured for opening of said reservoir and release of such fluid responsive to advancement of said tear-tab, means defining an opening in such housing for depositing such processing fluid on said film strip upon release of such fluid from said reservoir, a pull-strip having one end affixed to said tear-tab and the other end extended from said housing so that upon withdrawal of said pull-strip, said tear-tab is advanced within said housing to open said reservoir, and means for separating said pull-strip from said tear-tab following the opening of said reservoir so as to leave said tear-tab within said housing.

14. The applicator of claim 13 wherein said housing includes a channel for guiding said pull-strip in its path from said reservoir to the exterior of said housing, said channel configured for preventing contact of said pull-strip with such fluid upon release of such fluid from said reservoir.

15. The applicator of claim 14 wherein said separating means is located in said channel so as to release said tear-tab and store said tear-tab from said pull-strip within said channel.

16. The applicator of claim 13 whrein one end of said tear-tab is coupled to said one end of said pull-strip, and said one of said tear-tab is configured to be advanced along a given path over a predetermined distance to fully open said reservoir, and said separating means is located along said path a distance from said one end of said tear-tab at least substantially equal to said predetermined distance so as to release said tear-tab from said pull-strip simultaneously or following the full opening of said reservoir.

17. The method of depositing a layer of processing fluid on the exposed light sensitive emulsion of a cassette contained film strip during advancement of the strip in the cassette, the processing fluid being initially retained in adjoining relation to said film strip within a processing fluid reservoir sealed by a tear-tab closure having a pull-tab extended from one end thereof, the method comprising the steps of:
  drawing said pull-tab along a given path so as to tear said tear-tab from said reservoir means and thereby release its contained fluid to said film strip;
  releasing said pull-tab from said tear-tab; and
  storing said tear-tab within said cassette.

18. The method of claim 17 wherein said storing steps include separately storing said pull-tab and said tear-tab within said cassette.

19. The method of claim 17 wherein said step of drawing said pull-tab includes coupling said pull-tab to said film strip and thereafter advancing said film strip so as to draw said pull-tab along said given path.

20. The method of claim 17 wherein said cassette includes a deflector member, and said drawing step includes drawing said pull-tab across said deflector member so that said member engages said one end of said tear-tab so as to release said tear-tab from said pull-tab and to deflect said tear-tab along a path divergent from said pull-tab path and to a tear-tab storage area within said cassette.

21. In a film cassette containing a strip of photographic film to be exposed and processed without removal from said cassette, processing means also contained in said cassette and having a processing fluid reservoir initially sealed by a tear-tab closure to be removed after film exposure responsive to film strip advancement for deposition of the processing fluid on said film strip, improved means for removing the tear-tab closure automatically upon advancement of said film strip after exposure, said improved means comprising:
  a spool to which one end of said film strip is connected and, responsive to rotation of said spool, said film strip is coiled around in convolutions of varying diameters;
  means defining a discontinuity in said film strip;
  a resilient pull-strip joined at one end to the tear-tab closure and having at its other free end means engageable in said film strip discontinuity;
  an applicator housing for retaining said reservoir; and
  means supporting and stressing said pull-strip to retain said free end projecting yieldably against an uncoiled section of said film strip immediately adjacent said spool, the projecting free end of said pull-strip being of a length greater than the variable range of distances the free end of said film strip becomes spaced from said supporting means during rotation of said spool whereby said engaging means will engage said film discontinuity irrespective of the proximity of said film strip to said pull-strip supporting means within said distance range, said supporting and stressing means including a transverse wall formation connected to said applicator housing to establish a channel-like chamber peripherally spaced from said spool, said chamber being opened at one end for passage of said pull-strip to its connection with said tear-tab closure and having an exit opening for the free end of said pull-strip, said wall formation including a knife-like portion adjacent said exit opening for separating the connection of said pull-strip to said tear-tab closure upon passage of said pull-strip through said exit opening.

22. The apparatus recited in claim 21 wherein said channel-like chamber extends past said exit opening to provide a storage chamber for said tear-tab closure after removal thereof from said reservoir.

23. In a film cassette containing a strip of photographic film to be exposed and processed without removal from the cassette, processing means also contained in said cassette and having a processing fluid reservoir initially sealed by a tear-tab closure to be removed after film exposure responsive to film strip advancement for deposition of the processing fluid on said film strip, improved means for removing said tear-tab closure automatically upon advancement of said film strip after exposure, said improved means comprising:
  a spool to which one end of said film strip is connected and, responsive to rotation of said spool, said film strip is coiled around in convolutions of varying diameters;
  means defining a discontinuity in said film strip;
  a resilient pull-strip joined at one end to said tear-tab closure and having its other free end means engageable in said film strip discontinuity;
  means supporting and stressing said pull-strip to retain said free end projecting yieldably against an uncoiled section of said film strip immediately adjacent said spool, the projecting free end of said pull-strip being of a length greater than the variable range of distances the free end of said film strip becomes spaced from said supporting means during rotation of said spool whereby said engaging means will engage said film discontinuity irrespective of the proximity of said film strip to said pull-strip supporting means within said distance range, said pull-strip supporting means comprising an internal cassette wall formation spaced from the periphery of said spool and having an opening through which the projecting free end of said pull-strip extends and means, including a pull-strip channel located behind said wall formation, for constraining said pull-strip to a reverse end at said opening to hold a free end of said pull-strip yieldably against said film strip adjacent said spool; and means in said wall formation to separate said pull-strip from said tear-tab closure as said pull-strip passes through said opening in said wall formation, said channel extending beyond said wall formation opening to provide a storage chamber for said tear-tab closure after separation thereof from said pull-strip.

24. A film handling cassette comprising:

an elongated film strip;

means for defining a predetermined path along which said film strip may be progressively advanced, a portion of said predetermined path constituting a loop;

means responsive to externally mounted actuating means for advancing said film strip along said predetermined path;

a fluid applicator disposed within said loop, said fluid applicator including a housing member defining a concavity and a tear-tab disposed generally upwardly, when said cassette is located in its operative processing position, over said concavity to seal processing fluid in said concavity, one portion of said loop passing over the upper end of said concavity and another portion of said loop passing under the lower end of said concavity;

a flexible pull-strip having one end attached to the lower end of said tear-tab and its other end being initially in uncoupled disposition and arranged to be subsequently coupled to a section of said film strip as said film strip is progressively advanced along said predetermined path; and means for disposing said pull-strip along a folded path intermediate its two said ends, a section of said pull-strip immediately adjacent its said one end being disposed in substantially overlapping relationship with said tear-tab to exert a force upwardly on said tear-tab when said other end of said pull-strip is connected to said film strip and said film strip is advanced along said predetermined path, said pull-strip disposing means terminating in a turning point positioned a substantially greater distance from the nearest point thereto on said one portion of said loop than the distance between the upper end of said tear-tab and the nearest point thereto on said one portion of said loop, said pull-strip disposing means thus providing an extended section of said pull-strip having its said initially uncoupled end bearing lightly against said film strip prior to its being coupled thereto to minimize frictional forces between said pull-strip and said film strip.

25. The cassette of claim 24 additionally including an adhesive material on one side of said pull-strip for securing said pull-strip to said film strip after said pull-strip is coupled to said film strip and as it is advanced therewith.

26. The cassette of claim 24 wherein said pull-strip disposing means includes a pair of generally upwardly extending overlapping wall sections spaced from each other and from said tear-tab, said wall section closest to said tear-tab serving to preclude the processing fluid from flowing into the space between it and the other said wall section when the processing fluid is released from said concavity.

27. The cassette of claim 26 wherein said turning point is formed integrally with said other wall section.

28. The cassette of claim 27 additionally including sealing means disposed adjacent, and cooperating with, said turning point.

29. The cassette of claim 27 wherein said pull-strip disposing means additionally includes a guide roller positioned over the upper end of said wall section closest to said tear-tab and said pull-strip passes first over said guide roller and then over said turning point intermediate its said one end and its said other end.

30. A film handling cassette comprising:

a spool arranged to be rotated by externally mounted drive means;

an elongated film strip connected to said spool so as to be progressively coiled therearound when said spool is rotated;

means defining a concavity;

a member sealing said concavity to retain a supply of processing fluid therein;

means for applying the processing fluid to progressive incremental sections of said film strip after the processing fluid is released from said concavity and as said film strip is coiled around said spool;

a flexible member having one end coupled to said sealing member and an initially uncoupled end arranged to be selectively coupled to a predetermined location on said film strip as said film strip is coiled onto said spool, said film strip then exerting a force on said sealing member through said flexible member to unseal said concavity and permit the processing fluid to become available to said fluid applying means; and means for arranging said flexible means within said cassette so that it exerts a pulling force on said sealing member only after said predetermined location on said film strip has been coiled onto said spool.

* * * * *